No. 881,110. PATENTED MAR. 10, 1908.
F. COTTON.
REVERBERATORY FURNACE.
APPLICATION FILED FEB. 3, 1906.

WITNESSES
INVENTOR
FRANK COTTON.
By
ATTY

UNITED STATES PATENT OFFICE.

FRANK COTTON, OF HORNSBY, NEW SOUTH WALES, AUSTRALIA.

REVERBERATORY FURNACE.

No. 881,110.  Specification of Letters Patent.  Patented March 10, 1908.

Application filed February 3, 1906. Serial No. 299,252.

*To all whom it may concern:*

Be it known that I, FRANK COTTON, a resident of Hornsby, in the State of New South Wales and the Commonwealth of Australia, have invented certain new and useful Improvements in Reverberatory Furnaces, of which the following is a full, clear, and exact description.

This invention relates to that class of furnace in which the fuel used is in a gaseous form and its object is to provide a furnace capable of being raised to and worked at a very high temperature but which will be more economical than any furnace of that class now in use.

It consists mainly of a circular dome shaped furnace with a concave floor slightly sloping towards a tapping hole on one side and having on the other side a suitable hole for removing the slag. The ore or other material to be fused is fed through a circular opening in the top of the dome. When it is desired to insert a crucible within the furnace a suitably constructed block is placed in the center of the concaved floor and upon this is placed the crucible.

Tangential to the circumference of the furnace is a conduit into which the burner is introduced so that the flame issuing from the nozzle of the burner shall strike the sides of the furnace and acquire a circular motion. On the same side of the furnace and parallel to the inlet conduit is a second conduit conducting the waste gases to the chimney, these two conduits are in the same plane and as close together as practicable. The length of the inlet conduit should be approximately the same as the diameter of the furnace. The inner lining of the furnace consists of fire brick or other suitable fire sustaining material around which is a thick filling of sand and outside of this is an ordinary brick construction bound with iron plates or rods. But in order that this invention may be properly understood reference will now be made to the accompanying sheet of drawings in which:—

Figure 1:
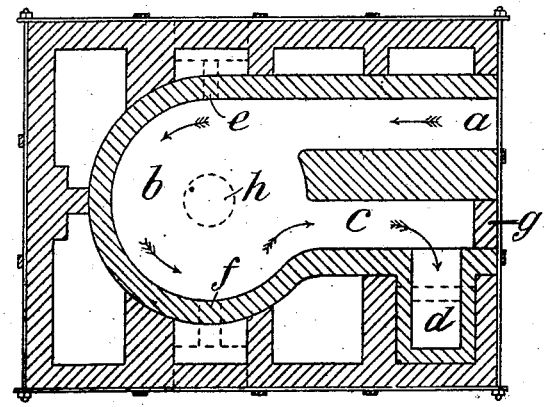
Figure 2:
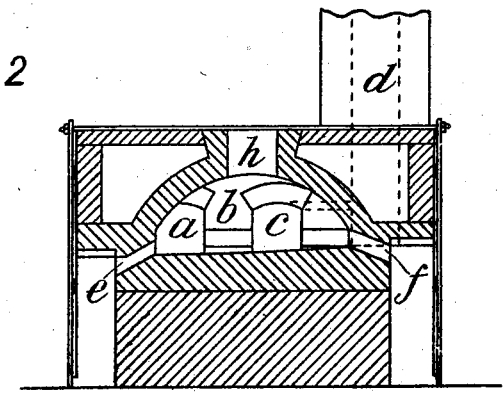
Figure 3:
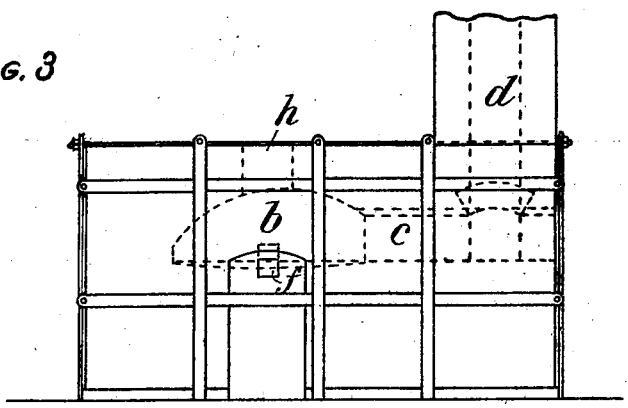

Figure 1 is a horizontal section through the furnace. Fig. 2 is a cross section through the center of the same. Fig. 3 is a side elevation.

The liquid fuel or other burner is introduced at the entrance of the conduit *a* leading to the furnace *b* while the flue *c* conducts the waste gases to the chimney *d*. The floor of the furnace *b* slopes slightly from all sides towards a tap hole *e* opposite to which there is a hole *f* for the removal of the slag, recesses being provided in the outer walls of the furnace to facilitate the operations of tapping the molten metal and removing the slag, while a loose brick *g* at the end of the channel *c* may be removed for the purpose of cleaning the furnace, flue and chimney. The roof of the furnace *b* is provided with a central circular opening *h* for the purpose of replenishing the furnace with ore or other material to be treated.

*k* represents a space between the inner and outer walls to be filled with sand packing. It will readily be seen that by introducing the flame of the burner at a tangent to the circumference of the circular furnace the flame will strike the wall of this furnace and acquire a circular motion as shown by the arrows in Fig. 1. This centrifugal motion causes the heavier gases to hug the wall of the furnace while the lighter gases which would otherwise escape unburned go to the center of the furnace where they are readily consumed by reason of the intense reflected heat from the dome.

What I claim and desire to secure by Letters Patent is:—

1. A reverberatory furnace comprising inner and outer walls separated by a filling of sand, a circular furnace chamber having a concaved floor and domed roof, an intake conduit arranged tangentially to the circumference of said chamber, the length of said intake conduit being approximately equal to the diameter of the furnace and an outlet conduit parallel to and in the same horizontal plane as said intake conduit but located non-tangentially with respect to the circumference of the furnace chamber.

2. A reverberatory furnace comprising inner and outer walls separated by a suitable filling of sand, a circular furnace chamber having a concaved floor and domed roof, said roof being provided with a central feed aperture for the material to be treated, a fuel intake conduit for said chamber located tangentially to its circumference, the length of said conduit being equal to the diameter of the furnace and an outlet conduit parallel to and in the same horizontal plane as said intake conduit but out of tangential line with respect to the circumference of said chamber.

In testimony that he claims the foregoing as his invention, he has signed his name in presence of two subscribing witnesses.

FRANK COTTON.

Witnesses:
WALKER SIGMONT,
T. O. ALLEN.